Patented Jan. 20, 1953

2,626,227

UNITED STATES PATENT OFFICE 2,626,227

3, 5 - DIMETHYLPHENOXYETHANOL, 4-CHLORO - 3, 5 - DIMETHYLPHENOXYETHANOL AND THEIR USE AS SYSTEMIC FUNGICIDES FOR PLANTS

Joseph A. Lambrech, South Charleston, W. Va., assignor to Union Carbide and Carbon Corporation, a corporation of New York No Drawing. Application November 30, 1950, Serial No. 198,477

5 Claims. (Cl. 167—30)

This invention relates to new and useful chemical products which have been found to have the property of being absorbed by the roots of plants and of being spread through the plants by the conducting system of the plant to inhibit infection by, or the development of, parasitic growths within the host plant. The invention also includes the treatment of plants by introducing the therapeutants into the plants, preferably through the root system and by applying the materials together with water to the medium in which the plants are growing.

Desirable plants are often adversely affected by parasites which cannot very well be killed or inhibited by sprays or other applications of toxicants to the surfaces of the plants; for instance tomato and carnation are internally attacked by a disease known as Fusarium wilt. In this disease the conducting system of the host plant is blocked by the growth of the parasite thereby preventing the translocation of food and water to the various parts of the host. Also, the parasite produces materials which are toxic to the host plant. Heretofore, attempts to control the disease have been by sanitation, that is sterilizing the soil, benches, etc. but this has been costly and none too satisfactory.

It is now found that this type of disease can successfully be controlled by an internal treatment of the host plant by getting into the plant one of the chemicals hereafter described as desirable. This is most easily accomplished by dissolving or suspending the chemical in water and watering the plants with such aqueous compositions, preferably by applying the treated water to the soil in which the plant is growing, thus enabling the plant to most readily absorb the chemical and avoiding complications which may arise because of contact of the chemical with an extended area of the plant surface. This method of applying the chemicals is particularly adapted to hothouse operations, for instance the growing of carnations. However, the chemicals may thus be applied wherever plants are watered, for instance by irrigation or otherwise.

The materials which have this unique property are: (1) 4-chloro-3,5-dimethylphenoxyethanol having the structural formula

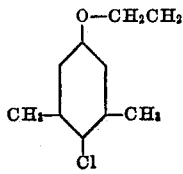

and (2) 3,5-dimethylphenoxyethanol having the structural formula

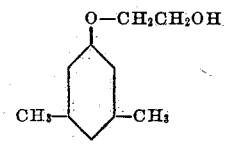

Related materials which, it would seem, should give somewhat equivalent results but which fail on test are: (3) para-chlorophenoxyethanol having the formula

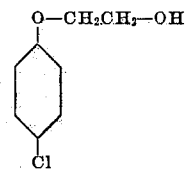

(4) ortho-nitrophenoxyethanol having the formula

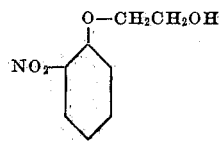

(5) phenylmethoxyethoxyethanol having the formula

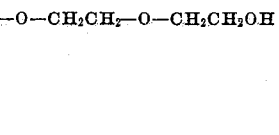

(6) 2-[2-(-alpha-methylbenzyloxyethoxy)]ethanol having the formula

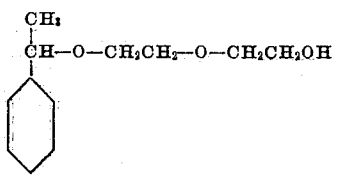

and (7) 2,4-dichlorophenoxyethanol having the formula

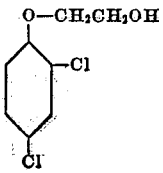

The materials are given the indicative numerals 1 through 7, inclusive, for reference herein.

The above materials were given greenhouse tests on tomatoes as internal parasiticides against the tomato wilt organism *Fusarium lycopersici*. Briefly, this test comprises growing individually potted plants in sand which is sterile so far as the wilt organism is concerned. The plants, throughout the test, are fed with nutrient solutions containing the major and minor elements necessary for normal plant development. When the plants are about 4 to 6 inches high, they are watered with aqueous solutions or suspensions of the chemicals under test. The watering is for ten successive working days and the solution is applied at the rate of 12.5 gallons per 100 square feet (1 pint per sq. ft.). Additional water, but containing none of the chemical, is applied as necessary for normal plant growth. Just before the eleventh watering is due, the plants are removed from the sand, thoroughly washed (including the roots), one or more of the roots is injured so that the wilt organism can quite readily enter the plant, and the plants are replanted in individual pots in fresh sand which contains none of the chemical and is sterile as to the parasite. A suspension of spores of the parasite is then poured on the sand. Thereafter, the plants are watered with sufficient water and nutrients for normal growth but containing none of the chemical under test. Check plants are similarly treated except that the water applied to them never contains a test chemical. The test is considered as completed after the check plants are killed by the disease, the wilt organism being a fungus which grows within the host plant. The tomato plants used in this test were of the variety Bonny Best.

The following Table 1 gives the results of this test. The number in the left column indicates the material having the corresponding number previously given to it herein. The data in the center column are the concentrations of the chemical in the aqueous solution or suspension applied to the sand in treating the plants, the ratio 1:64,000 meaning, for instance, that the aqueous solution was 1 part by weight of the chemical in 64,000 parts by weight of water. The data in the right column are the disease grades of the plants at the completion of the test, "1" representing the disease grade of the check plants and "0" representing no disease. For practical purposes, a material should have an index number or rating of 0.2 or less.

TABLE 1

| Code No. | Concentration Applied | Index |
|---|---|---|
| 1 | 1:32,000 | 0.05 |
| 1 | 1:64,000 | 0.04 |
| 1 | 1:128,000 | 0.16 |
| 1 | 1:256,000 | 0.38 |
| 2 | 1:4,000 | 0.00 |
| 3 | 1:4,000 | (1) |
| 3 | 1:16,000 | 5.45 |
| 4 | 1:4,000 | 0.28 |
| 5 | 1:4,000 | 0.68 |
| 6 | 1:16,000 | 0.50 |
| 7 | 1:32,000 | (1) |
| 7 | 1:64,000 | 5.25 |

[1] Host killed.

As is evident from the foregoing, the first two materials are very effective but the remaining materials are not effective, Materials Nos. 3 and 7 even being very negative with respect to inhibiting the parasite. Material No. 1 is effective at such extreme dilution that it is preferable to No. 2 in inhibiting the wilt although it has a formative effect upon tomato foliage.

Material No. 1 proved to be so very effective in the tomato tests that it was tested against *Fusarium dianthi*, a wilt organism which attacks carnations. In these tests, carnation cuttings were rooted and then transplanted to soil in benches in the manner used for raising carnations for market. The soil was naturally infected with the wilt organism. After benching, the plants were watered twice a week with a 1:64,000 solution of Material No. 1 at the rate of 1 pint per square foot for 8 weeks. Other waterings were as necessary for normal plant growth with water containing none of the chemical. Check plants were given the same treatment except that the water used for them contained none of the chemical. Approximately 100 plants were used in the test bench, planted about 4 inches apart, and the same number of check plants were used in a bench of the same size. Counts made 3½ months after treatments stopped showed that 23% of the plants receiving the solution of Material No. 1 had the wilt while 44% of the check plants had the wilt.

In another test, the growing procedure being in accordance with usual commercial practice, cuttings of carnations were made, planted in rooting beds until rooted, transplanted into flats and allowed to grow until about 12 inches high, and then transplanted into production beds or benches for final growth and flowering. For the test, during the time that the plants were in the flats (approximately 4 months) they were watered once a week with a 1:64,000 solution of Material No. 1 at the rate of 1 pint per square foot of soil surface. Other waterings, with water containing no added chemical, were as necessary to maintain normal plant growth. All of the plantings were in soil naturally infected with the carnation wilt organism. Check plants were grown in the same manner but the water used for them contained none of the chemical. Counts made when the first flowers were ready for market (approximately 8 months after the rooted cuttings were planted in the flats) showed that only 3.2% of the plants treated with Material No. 1 had the wilt while 50.6% of the check plants had the disease.

The carnations used in the above tests were Miller's Yellow and the waterings with the aqueous solutions of the chemical were made by applying the solutions on the surface of the soil under the plants.

The operative materials referred to herein may be prepared in the following manner:

*Example 1*

Material No. 1 (4-chloro-3,5-dimethylphenoxyethanol) was prepared by first preparing 4-chloro-3,5-dimethylphenol by slowly adding 135 grams of sulfuryl chloride to a mixture of 122 grams of 3,5-dimethylphenol and 300 cc. of carbon tetrachloride at 35°–40° C. Upon cooling, the 4-chloro-3,5-dimethylphenol separated as a white crystalline solid which was isolated by filtration and then recrystallized from heptane. The product, a white crystalline solid, melts at 115° C.

Material No. 1 was then prepared by adding 312 grams of the 4-chloro-3,5-dimethylphenol to a solution of 84 grams of sodium hydroxide in 600 cc. of water, the mixture being heated at 85° C. for 1 hour. The mixture was then cooled to 65° C. and 162 grams of ethylene chlorohydrin were slowly added. After the addition of the chlorohydrin, the reaction mixture was heated at 90° C. for 90 minutes. Upon cooling, the mixture separated into two layers. The lower layer was drawn from the organic layer and the product was isolated by distillation under reduced pressure. The 4-chloro-3,5-dimethylphenoxyethanol is a white crystalline solid which boils at 134° C. at a pressure of 5 mm. of mercury and melts at 42°–44° C..

*Example 2*

Material No. 2 (3,5-dimethylphenoxyethanol) was prepared by adding 244 grams of 3,5-dimethylphenol to a solution of 84 grams of sodium hydroxide in 600 cc. of water. The mixture was heated at 85° C. for 1 hour. The solution of sodium 3,5-dimethylphenolate thus obtained was cooled to 65° C. and 177 grams of ethylene chlorohydrin were slowly added over a period of about 60 minutes. The reaction mixture was then heated at 90° C. for 2 hours. Upon cooling, the mixture separated into two layers. The lower (salt) layer was drawn from the upper (organic) layer. The organic layer was washed twice with water and then distilled under reduced pressure. The distillate (3,5-dimethylphenoxyethanol) boiled at 129° to 131° C. at 4 mm. and at normal temperatures is a white crystalline solid having a melting point of 41° C.

The other materials referred to herein were prepared in similar manner but, while their formulae are somewhat like the formulae of Materials Nos. 1 and 2, their biological properties are such that they act entirely differently from Materials Nos. 1 and 2.

What is claimed is:

1. A material of the group consisting of 3,5-dimethylphenoxyethanol and 4-chloro-3,5-dimethylphenoxyethanol.

2. A composition comprising a material of the group consisting of 3,5-dimethylphenoxyethanol and 4-chloro-3,5-dimethylphenoxyethanol and a carrier non-reactive with the said ethanol with which it is associated.

3. Method of treating plants which comprises introducing into the plant a material of the group consisting of 3,5-dimethylphenoxyethanol and 4-chloro-3,5-dimethylphenoxyethanol.

4. Method of treating plants which comprises applying to the roots of the plant a material of the group consisting of 3,5-dimethylphenoxyethanol and 4-chloro-3,5-dimethylphenoxyethanol.

5. Method of treating plants which comprises applying to the soil in which the plants are growing a material of the group consisting of 3,5-dimethylphenoxyethanol and 4-chloro-3,5-dimethylphenoxyethanol.

JOSEPH A. LAMBRECH.

REFERENCES CITED

The following references are of record in the file of this patent:

UNITED STATES PATENTS

| Number | Name | Date |
|---|---|---|
| 2,158,957 | Coleman et al. | May 16, 1939 |
| 2,158,958 | Coleman et al. | May 16, 1939 |
| 2,291,528 | Bruson et al. | July 28, 1942 |
| 2,569,423 | Luskin | Sept. 25, 1951 |
| 2,573,769 | Lambrech | Nov. 6, 1951 |

OTHER REFERENCES

Boyd et al., Jour. Chem. Soc. (London), volume 105, pages 2134 and 2136 (1914).